United States Patent [19]

Bunyan et al.

[11] 3,983,829

[45] Oct. 5, 1976

[54] SHIPS' STERN CONSTRUCTION

[75] Inventors: Thomas Walter Bunyan, London; David Garrett, Harpenden, both of England

[73] Assignee: Pilgrim Engineering Development Limited, London, England

[22] Filed: May 22, 1975

[21] Appl. No.: 579,995

[30] Foreign Application Priority Data

May 23, 1974 United Kingdom............... 23006/74
Oct. 16, 1974 United Kingdom............... 44868/74

[52] U.S. Cl. ................................................. 114/57
[51] Int. Cl.² ........................................... B63B 1/08
[58] Field of Search ............ 114/56, 57, 62; 115/39, 115/42, 53

[56] References Cited
UNITED STATES PATENTS

| | | |
|---|---|---|
| 2,167,688 | 8/1939 | Scowley ................................ 114/56 |
| 2,784,691 | 3/1957 | MacMillan, Jr. ...................... 114/57 |
| 3,930,456 | 1/1976 | Ludvigsson .......................... 114/57 |

Primary Examiner—Trygve M. Blix
Assistant Examiner—Stuart M. Goldstein
Attorney, Agent, or Firm—Woodcock Washburn Kurtz & Mackiewicz

[57] ABSTRACT

The stern construction has an open channel let in to each side of the hull. The channel merges with the hull at its forward end and terminates in front of the upper part of the propeller disc at its rear end. The lower side of the channel is formed by a depending part of the hull which houses the tailshaft. The upper edge of each channel joins the part of the hull above the channel along a knuckle line. The upper side of the channel is disposed at an angle of inclination to the horizontal which decreases towards the rear of the ship so as to intercept the wake of the ship progressively and divert it into the upper part of the propeller disc.

The invention is applicable to full bodied ships such as tankers.

8 Claims, 9 Drawing Figures

SHIPS' STERN CONSTRUCTION

The present invention relates to improvements in ships' stern construction and particularly to the stern construction of a full-bodied ship such as a tanker.

One problem facing ship designers is that of keeping hull vibration to an acceptable level. Excessive vibration not only causes unpleasant noise in the vessel but may also produce dangerous stressing of the ship's structure. In addition, the forces causing hull vibration also cause other undersirable effects.

The problem of hull vibration arises more nowadays than in the past because ships are generally larger and more powerful. The increase in power results in an increase in the excitation forces which cause hull vibration and the increase in size makes the hull more susceptible to vibration by these forces.

A principal cause of hull vibration is pressure fluctuations in the water generated by the propeller which act on the hull above the propeller. Due to variations in the wake across the propeller disc, that is, the area swept out by the propeller blades, the blades undergo substantial changes in loading as the propeller rotates. With a conventional single screw stern construction, the maximum wake at the propeller disc may be as much as eight times the minimum wake there. One effect of the rapidly changing loading on the propeller blades as the propeller rotates is to produce the strong pressure pulses in the water which excite hull vibrations and cause serious cavitation errosion of the propeller blades.

Other effects of the uneven distribution of wake across the propeller disc are a reduction in the efficiency of the propeller and vibration of the tailshaft which increases the wear of the bearing linings and may damage the oil seals and add to the hull vibration. With a conventional hull, there is a heavy concentration of high wake at the upper portion of the propeller disc which gives rise to an eccentric loading of the propeller causing the tailshaft to run at the top of the stern bearing. Finally there is an increase in the dynamic bending stresses applied to the tailshaft which may cause fatigue failure of the tailshaft.

One proposal for overcoming the problem of hull vibration is to attach fins to the sides of the hull in front of the propeller disc to collect water and direct it into the upper part of the propeller disc, thus producing a more uniform wake field across the propeller disc.

Whilst this proposal has the effect of reducing hull vibration, the addition of fins increases the surface area of the stern, increasing the skin friction and decreasing the efficiency of the hull. The decrease in efficiency may counteract the increase in power which gave rise to the problem of vibration.

The object of the invention is to reduce hull vibration by producing a more uniform wake field across the propeller disc, without reducing the efficiency of the hull. This object is achieved according to the invention by providing channels let into the overall outline of the ship for directing water into the upper part of the propeller disc, instead of forming channels by the addition of fins.

Thus, according to the present invention there is provided a ship's stern construction in which an open channel is let into each side of the hull which channel merges with the hull at its forward end and terminates in front of the upper part of the propeller disc at its rear end, the lower side of the channels being formed by a depending part of the hull which houses the tailshaft, the upper edge of each channel joining the part of the hull above the channel along a knuckle line, and the upper side of the channel being disposed to divert the wake to flow substantially horizontally into the upper part of the propeller disc. By using channels let into the sides of the hull the surface area of the stern is not increased substantially as compared with an equivalent hull without channels so that the efficiency of the hull is not reduced and may even be increased because of the improved flow. Tank testing of a ship model has indicated that there should be a marked improvement in the efficiency of a full scale 430,000 dwt hull as well as smaller full bodied single screw hull forms made in accordance with the invention.

In the preferred form of the present invention the lower sides of the aft part of the channels extend substantially vertically and the part of the hull between these parts of the channels tapers in width uniformly towards the stern. The upper sides of the channels at their forward ends are preferably inclined at an angle to the horizontal corresponding to the angle of flow of the upwardly moving wake at the service speed of the ship. The angle of inclination of the upper side of the channel decreases towards the stern and is substantially horizontal at the aft end. The upper sides of the channels preferably approximate to part of a surface of revolution about the axis of the propeller. The line of the knuckle is preferably such as to appear parabolic when viewed from the stern.

In a conventional ship, the stern profile is curbed rearwardly in an arc over the propeller and is then curved upwardly to form the aft extremity of the ship. This curved shape is necessary to provide the large clearance between the propeller and the part of the hull which lies above the propeller that is necessary in order to moderate the effects on the hull of the propeller-excited pressure fluctuations in the water, and to conform with the wake pattern produced by the rest of the ship. This curved shape is usually formed in one piece as a stern frame casting. For a 400,000 dwt ship, the stern frame may be 50 ft. high and weigh 600 tons. It is extremely expensive to manufacture and when it arrives at the shipyard it is often found to be twisted so that additional pieces have to be welded on to correct its shape.

According to a preferred form of the present invention, the profile of the stern runs vertically from the keel and then extends substantially horizontally along the underside of the overhanging aft part of the hull so that the aft part of the hull joins the stern of the depending part of the hull substantially at right angles. This shape of hull is made possible by the more uniform wake distribution across the propeller disc which enables the clearance between the propeller and the underside of the overhanging aft part of the hull to be reduced without causing unacceptable hull vibration, and by the overall change in flow around the stern of the hull particularly the fact that the water flows substantially horizontally into the propeller disc. The preferred hull shape makes it possible to construct the hull without the large stern frame casting of conventional hulls. Instead the hull may be constructed from plates, ribs and stringers, with the possible inclusion of a small casting to provide strength where the overhanging aft part joins the depending part which house the tailshaft.

It is well known that improved propulsive efficiency can be obtained by reducing the shaft RPM and increasing the propeller diameter. In most single screw merchant ships the propeller diameter is limited by the space available for the propeller in the aperture. Certain clearances between propeller blades, hull and rudder are required by Classification Societies. These clearances have been established by the Societies from experience over the years and are specified primarily to reduce the risk of propeller induced vibration.

By improving the wake patterns of single screw ships with large block coefficient on which this problem is often most severe the present invention enables propellers of larger diameter to be fitted with smaller hull clearances without the risk of vibration problems. Instead of normal operating speeds of about 80 rpm as are found on conventional ships, a ship adapted to be operated at a normal operating speed of 60 rmp can be achieved.

Finally the stern construction according to the present invention enables the construction of the rudder to be simplified. At the same time as improving the wake across the propeller disc, the wake in the region where the rudder is located is improved. This enables a smaller rudder and thus of lighter construction to be used to achieve the same effect as a much larger heavier rudder on a conventional ship. The lowering of the underside of the overhanging aft part of the hull as compared with a conventional ship enables a spade rudder to be used because there is a greater depth of hull to accommodate the rudder stock and the rudder stock does not project far below the underside of the overhanging part so that the bending stresses on the rudder stock are small.

Figure 1:
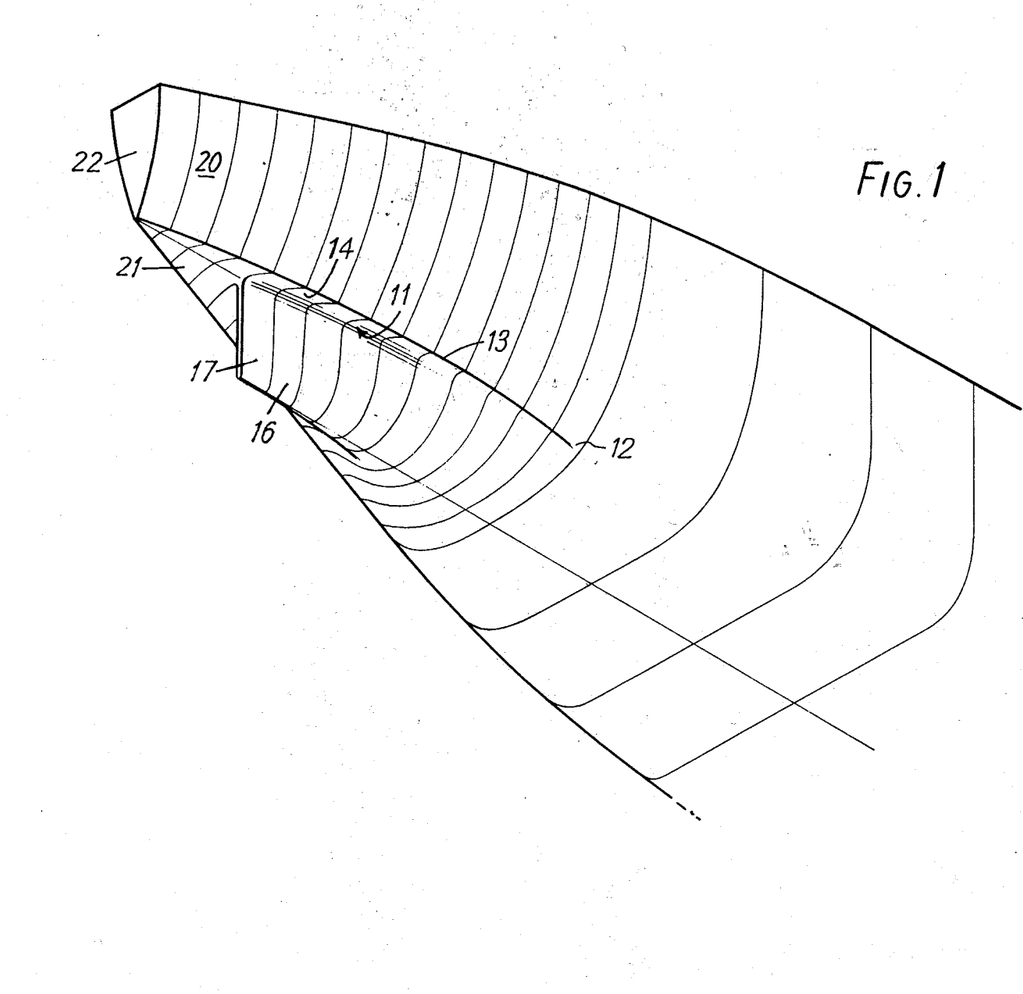
FIG. 1 shows an isometric view of a stern construction according to the invention.

An embodiment of the invention will now be described by way of example with the reference to the accompanying drawings of which:

FIG. 1 shows an isometric view of a hull stern construction according to the invention.

Figure 2:
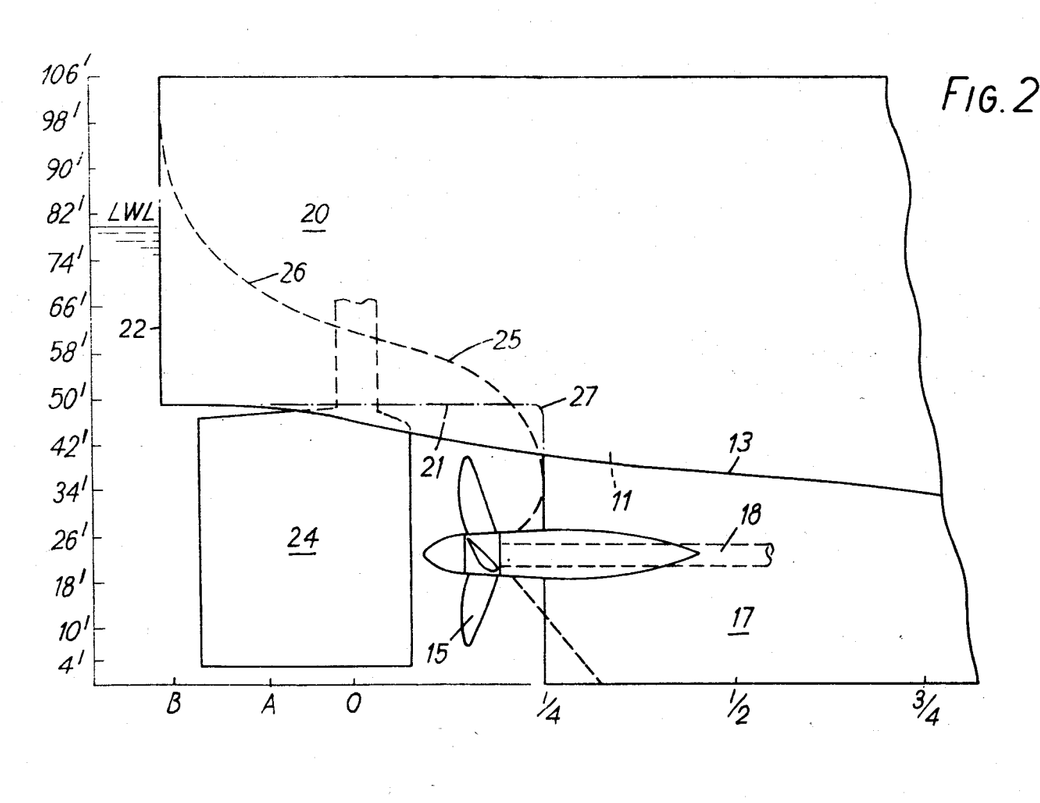
FIG. 2 shows a side view of the stern construction of FIG. 1 with the stern profile of a conventional ship shown in broken lines.
Figure 3:
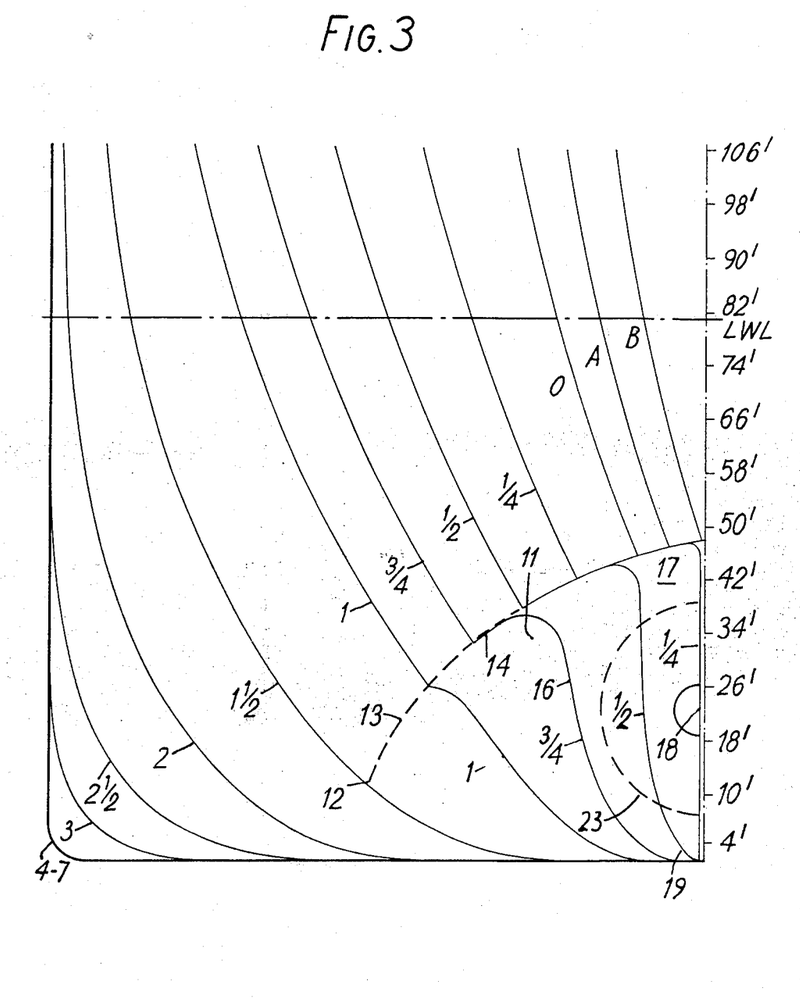
FIGS. 3 and 4 shows line drawings of the stern construction of FIGS. 1 and 2.
Figure 4:
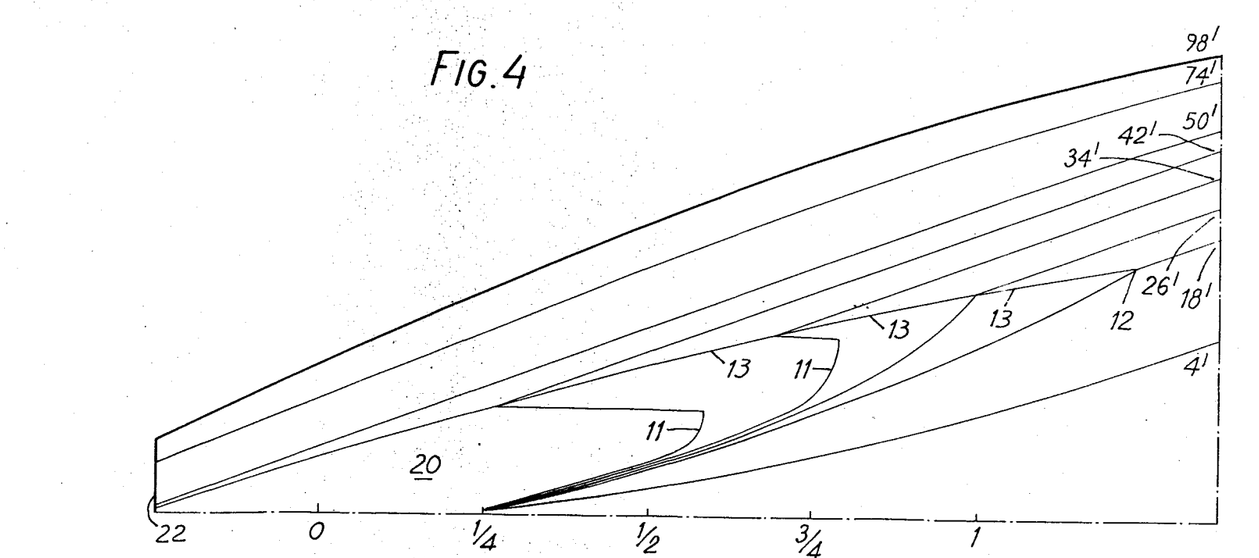

In FIGS. 2 and 3 the height of the ship from the keel is shown by the scales at the side. The numbers represent the height in feet. The lines on FIG. 4 show the profiles of horizontal sections of the hull at the 4ft, 18ft, 26ft, 34ft, 42ft, 50ft, 74ft, 98ft, waterline. FIG. 3 shows profiles of transverse vertical sections of the hull. The position of each section along the hull is indicated by a number which represents the distance from the aft perpendicular as a proportion of length of the ship, the distance between the aft perpendicular and the forward perpendicular being 10 units. The positions of the sternmost sections are shown in FIG. 4.

The hull shown in the drawings is that of a full bodied 430,000 dwt tanker. As can be seen from FIG. 3, the middle section of the ship, represented by the curves 4 to 7, have a substantially rectangular profile. Towards the rear of the ship the profiles of the transverse section become more rounded and the overall width of the ship becomes narrower. Starting at the position of the transverse section 1½, a channel 11 is let into each side of the overall outline of the hull. Each channel merges with the overall outlined of the hull at its forward end 12 and gets deeper towards the stern. The upper side of the channel joins the rest of the hull along a knuckle line 13 which is substantially parabolic when viewed from the stern. The upper sides 14 of the channels 11 are inclined at an angle to the horizontal at their forward end corresponding substantially to the direction of flow of the upwardly moving wake at that point. The angle of inclination of the upper sides 14 decreases progressively towards the stern and is substantially horizontal at the position of the cross section ¼. The upper sides 14 of the aft part of the channels 11 approximate to part of a surface of revolution about the axis of the propeller 15.

The lower sides 16 of the channels 11 are formed by a depending part 17 of the hull which houses the tailshaft 18. At the aft part of the channels, the lower sides 16 extend substantially vertically and the part 17 of the hull between these parts of the channel tapers in width uniformly towards the stern. Thus the aft part of the depending part of the hull has the appearance of a vertical wedge. The underside of the depending portion is rounded as shown at 19.

The depending part 17 terminates in a vertical line at its stern end at the transverse section ¼. The upper part of the hull continues aft of the section ¼ to form an overhanging part of the hull 20. The underside 21 of the overhanging part extends substantially horizontally aft from the frame that is positioned at the section ¼ so that it joins the said frame at substantially right angles. The underside 21 is curved transversely about an axis substantially coincident with the axis of the propeller. The sides of the hull continue to taper towards the stern in the region of the overhanging aft part 20 as shown by the transverse sections A and B. The aft extremity 22 is flat and vertical and is very narrow compared with the overall width of the ship.

The propeller disc is shown in FIG. 3 at 23. Behind the propeller disc a rudder 24 is mounted. The rudder 24 is a balanced spade rudder, that is, it is supported only by the rudder stock.

FIG. 2 also shows in broken line the profile of a stern of a ship of conventional structure. The profile is curved to the stern in an arc over the propeller at 25 and then is curved upwardly at 26 to form the aft extremity of the ship. The curve at 25 provides a large clearance between the propeller and the overhanging part of the hull in order to moderate effects on the hull of the pressure fluctuations in the water caused by the propeller. The curve also conforms with the upwardly flowing wake of the ship. A spade rudder cannot satisfactorily be used with a conventional stern construction such as that shown in FIG. 2. The upper part of the rudder would be in water of low wake and therefore have little effect on the steering of the ship. It would therefore be necessary to make the spade rudder of large size and the depth of the overhanging part of the hull is insufficient to bear the weight and bending forces on such a large rudder.

Figures 5, 7:
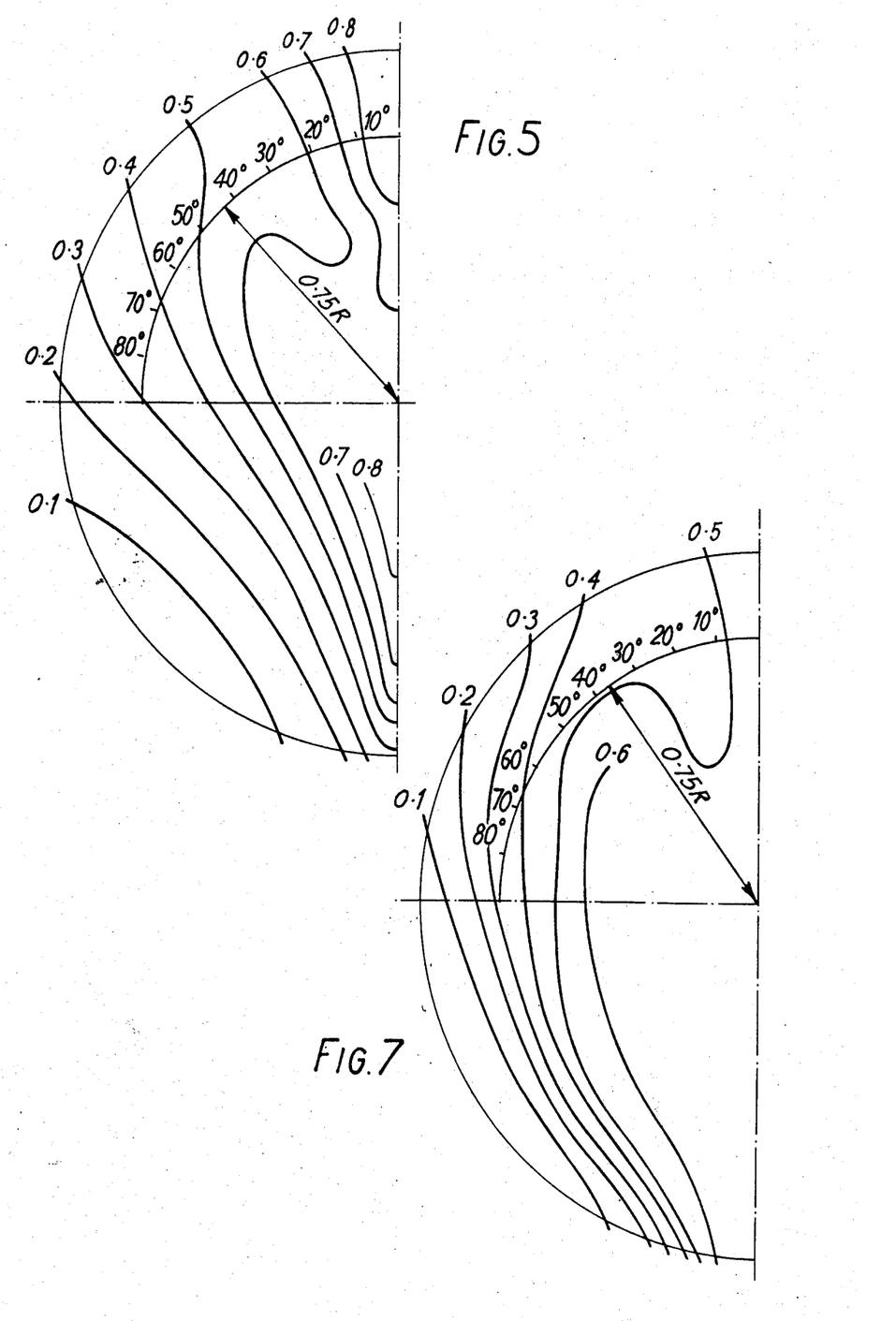
FIG. 5 shows a polar diagram of the wake distribution at the propeller disc of a ship with a hull of conventional design.
FIG. 7 shows a polar diagram of the wake distribution at the propeller disc of a ship with a hull construction as shown in FIGS. 1 to 4.
Figure 6:
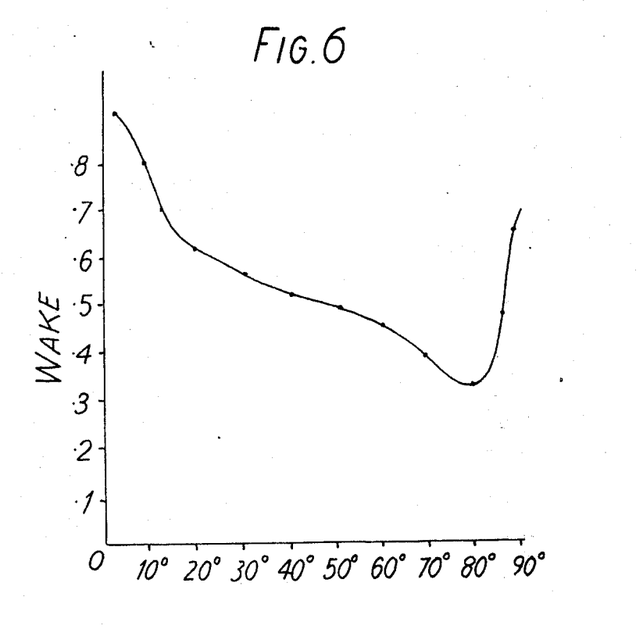
FIG. 6 shows the distribution of wake for a conventional hull along an arc at a radius of 0.75 R where R is the radius of the propeller disc.

FIGS. 5 and 6 shows the wake distribution across the propeller disc for a ship of conventional stern construction such as that shown in broken line in FIG. 2. In FIG. 5 the contours represent the wake as a fraction of the ship's speed. In the upper part of the propeller disc there is a heavy concentration of high wake. As the propeller blades rotate they are subjected to changes in loading due to the changes in wake. FIG. 6 shows the wake distribution along an arc at a radius of 0.75 R where R is the radius of the propeller disc. The most sensitive zone from the point of view of variations in wake velocity, is that between 0° and 45° on either side of the top dead centre position. On the assumption that the mean wake is 0.4, the shock forces on the blade which are proportional to $V^2$ is deduced as a variation of $0.8^2/0.4^2 \longrightarrow 0.5^2/0.4^2 = 64/16 \longrightarrow 25/16$ is $4 \longrightarrow 1.56$ over 45° blade rotation. This variation in loading causes the rotating blades to produce pressure fluctuations in the water which excite hull vibration. Other effects of the uneven distribution of wake are reduced propeller efficiency, serious cavitation erosion of the propeller blades, large eccentric loading of the propeller causing it to run in the top of the stern bearing, hammering of tailshaft in the bearings which may cause the white metal anti-friction lining to break up and damage to the oil seals, and increased dynamic bending stresses on the tailshaft which cause fatigue failure at the loading edge of the keyway in the tailshaft.

Figure 8:
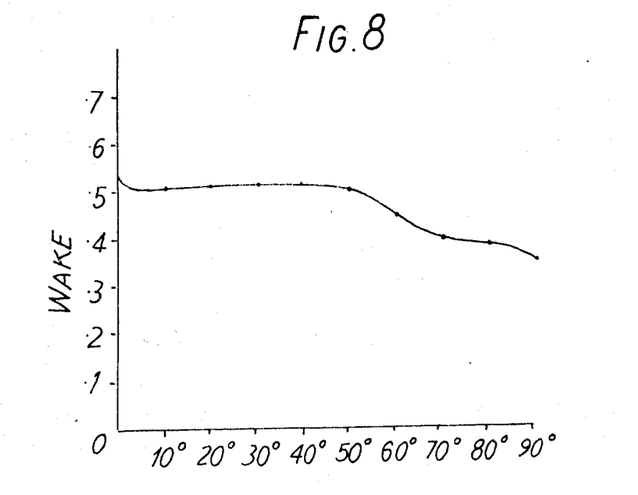
FIG. 8 shows the distribution of wake for the hull of FIGS. 1 to 4 along an arc at a radius of 0.75 R where R is the radius of the propeller disc.
Figure 9:
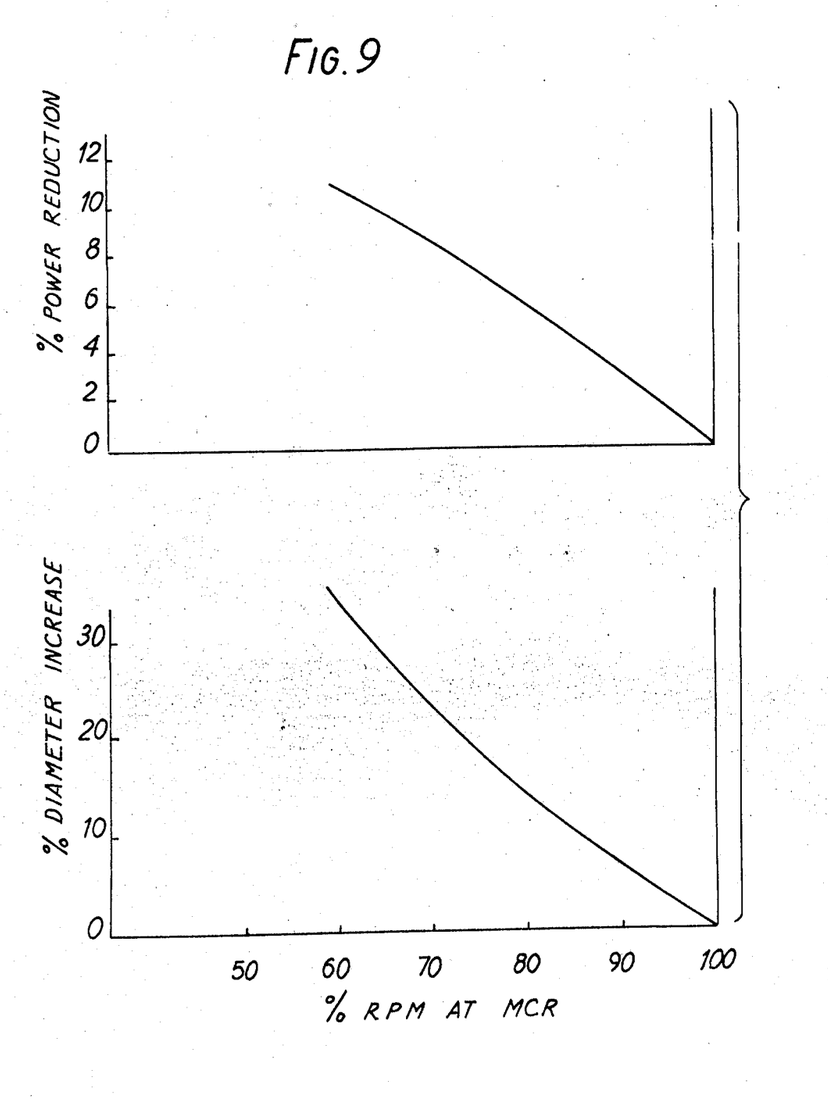
FIG. 9 shows the effects of increasing propeller diameter.

The hull construction according to the invention as described with reference to FIGS. 1 to 4 produces a more even distribution of wake across the propeller disc as shown in FIGS. 7 and 8. The upper sides 14 of the channels 11 intercept the upwardly moving wake and direct it into the upper part of the propeller disc. At their forward ends, the upper sides of the channels are inclined so as to be substantially parallel to the upwardly moving wake at the service speed of the ship. In this way the channel causes minimum disturbance of the water flow around the stern. The upper sides of the channels 11 are inclined progressively less towards the rear so that the water gathered by them is directed horizontally into the propeller disc. As shown in FIGS. 7 and 8, the variations in wake across the propeller disc are substantially reduced as compared with a conventional ship. The shock effect over a 45° blade rotation are $25/16 \longrightarrow 20/16 = 1.56 \longrightarrow 1.25$. Comparing this with the conventional case improvement ratio is $4/1.50 = 2.56$ to $1.56/1.25 = 1.25$ which means that the peak shock is reduced by a factor of 2.56. The effect of this is to reduce the overall resistance of the hull, to reduce the level of propeller-excited hull vibration and noise, to reduce the cavitation erosion of the propeller and to produce a much more stable operation of the propeller shaft in the stern bearings, the tendency to lift and hammer in the bearings being reduced or even eliminated.

The improved wake pattern enables the clearance between the hull and the propeller to be reduced because of the reduction in the pressure fluctuations that give rise to hull vibration. This in turn enables propellers of a larger diameter than is usual for ships of this size, to be used. The larger propellers can operate at lower rpm. than conventional propellers and thus the efficiency of the ship is further improved.

To evaluate the possible gains in propulsive efficiency obtainable by increasing propeller diameter an investigation has been carried out on three typical tanker forms of 50,000, 200,000 and 400,000 tonnes deadweight. To provide a consistent basis for comparison a standard series of hull forms was used with the actual dimensions to calculate the hull performance. A consistent propeller chart was used to calculate the performance of optimum propellers for each hull at specified diameters. The basic diameters were taken as for the as-built propellers for each ship and these diameters were increased in steps up to about 35% greater than basic. This was considered to be the maximum possible increase with the design of the present invention.

FIG. 7 shows the results of these calculations in the form of percentage improvement in required propulsive power for a given ship speed plotted against percentage of basic optimum RPM at MCR (maximum continuous rating). It can be seen that the diameter increase of 35% corresponds to an RPM decrease of about 40% and a power saving of about 11% from basic. These relationships were the same for each ship and are therefore considered to apply to tanker forms in general from 50.000 to 400,000 tonnes deadweight with basic RPM at MCR in the range 80 to 125.

Such power savings would provide considerable financial advantages but there are some practical consequences to be considered which will reduce the overall economic benefits. These are the increased propeller diameter increases the weight and cost of the propeller, the reduced rpm may require special gearing arrangements at possible increased weight and cost and the shaft torque will be increased requiring increased diameter of shafting.

The change in flow around the stern of the ship and in particular the horizontally moving water flowing into the propeller disc enables the overhanging aft part of the ship to be constructed as shown in FIG. 2. The increased depth of the overhanging part of the hull 20 gives greater support for the spade rudder and the lowering of the underside of the overhanging part as compared with the convention hull enables the spade rudder to be placed in the water where it is most effective. Finally the improvement in the wake at the propeller disc also improves the wake in the region where the propeller operates so that a smaller rudder can be used.

The horizontal underside to the overhanging part of the hull facilitates the construction of the hull. In order to produce the curved profile of a conventional ship it was necessary to form the hull around a stern frame casting which is expensive to produce (150,000 British pounds for a 250,000 dwt tanker). The rectangular profile of the stern construction according to the invention enables the hull to be formed from plates, ribs and stringers with a small casting to reinforce the corner 27 where the overhanging part meets the stern of the depending part 17. A considerable reduction in the construction cost of the hull can thus be achieved.

The reduction in the forces acting on the tailshaft also enables the stern to be made of light construction and thereby a further reduction in the cost of the hull is achieved.

We claim:
1. In a ship's hull, a stern construction comprising: a tailshaft, a propeller mounted on said tailshaft, said propeller having blades defining the effective area or disc of said propeller, two downwardly and outwardly open channels let into the hull on opposite sides of the hull, said channels merging with the rest of the hull at their forward ends and terminating at their rear ends in front of an upper part of the propeller disc, a depending part of the hull housing said tailshaft and each of said channels having its lower side formed by said depending part of the hull, a knuckle line on each side of the hull, each of said channels having an upper edge formed by said knuckle line, and each of said channels having an upper side which at its sternmost end curves outwardly and downwardly, said channels being disposed to divert the wake to flow substantially horizontally into the upper part of the propeller disc.

2. A ship's stern construction according to claim 1 in which said lower side of the aft part of each of said channels extends substantially vertically and the part of the hull between these parts of said channels tapers in width uniformly towards the stern.

3. A ship's stern construction according to claim 2 in which said upper side of each of said channels at the forward end inclines at an angle to the horizontal corresponding to the angle of flow of the upwardly moving wake at the service speed of the ship.

4. A ship's stern construction according to claim 3 in which said angle of inclination of said upper side of each of said channels decreases towards the stern and is substantially horizontal at the aft end.

5. A ship's stern construction according to claim 1 in which said upper side of each of said channels approximate to part of a surface of revolution about the axis of the propeller.

6. A ship's stern construction according to claim 1 in which the line of the knuckle is such as to appear parabolic when viewed from the stern.

7. A ship's stern construction according to claim 1 in which the profile of the stern runs vertically from the keel and then extends substantially horizontally along the underside of the overhanging aft part of the hull so that the aft part of the hull joins the stern of the depending part of the hull substantially at right angles.

8. A ship's stern construction according to claim 1 in which the ship's propeller is adapted to rotate at a normal operating speed of about 60 rpm.

* * * * *